United States Patent [19]

Kreuzer et al.

[11] Patent Number: 4,782,254
[45] Date of Patent: Nov. 1, 1988

[54] DIRECT-CURRENT DYNAMO ELECTRIC MACHINE, AND METHOD OF MANUFACTURE

[75] Inventors: Helmut Kreuzer; Klaus-Peter Meier, both of Schweiberdingen, Fed. Rep. of Germany

[73] Assignee: Robert Bosch GmbH, Stuttgart, Fed. Rep. of Germany

[21] Appl. No.: 4,063

[22] Filed: Jan. 16, 1987

Related U.S. Application Data

[62] Division of Ser. No. 724,799, Apr. 19, 1985, Pat. No. 4,682,410, which is a division of Ser. No. 409,561, Aug. 19, 1982, abandoned.

[30] Foreign Application Priority Data

Nov. 28, 1981 [DE] Fed. Rep. of Germany ....... 3147221

[51] Int. Cl.$^4$ ............................................. H02K 15/10
[52] U.S. Cl. ........................................ 310/45; 29/605; 310/208; 336/205; 427/185
[58] Field of Search ................. 310/269, 43, 194, 216, 310/215, 254, 42, 45, 186, 179, 180, 208; 336/205; 427/116, 185; 29/596, 605

[56] References Cited

U.S. PATENT DOCUMENTS

| | | |
|---|---|---|
| 975,425 | 11/1910 | Hensley . |
| 2,061,388 | 11/1936 | Schou ..................................... 310/45 |
| 3,244,918 | 4/1966 | Pennell et al. ....................... 310/184 |
| 3,333,131 | 7/1967 | Bush et al. ............................ 310/194 |
| 3,877,142 | 4/1975 | Hamano et al. ..................... 310/194 |
| 4,471,247 | 9/1984 | Cotton .................................. 310/45 |
| 4,651,039 | 3/1987 | Yamamoto ........................... 310/45 |

Primary Examiner—Patrick R. Salce
Assistant Examiner—D. L. Rebsch
Attorney, Agent, or Firm—Frishauf, Holtz, Goodman & Woodward

[57] ABSTRACT

The commutating poles of vehicular-type d-c motors, for example for trolley buses or trolley cars, are made by winding, on edge, a copper strip, permitting the wound copper strip to resiliently, spring-like expand so that the individual spiral loops thereof will be slightly spaced from each other, and then exposing the copper strip in a fluidized bed to an insulating powder, for example polyethylene or polyurethane, which is subsequently cured in a hardening or sintering process.

4 Claims, 1 Drawing Sheet

DIRECT-CURRENT DYNAMO ELECTRIC MACHINE, AND METHOD OF MANUFACTURE

This is a division of application Ser. No. 724,799 filed Apr. 19, 1985, now U.S. Pat. No. 4,682,410, issued July 28, 1987, which was a division of Ser. No. 409,561 filed Aug. 19, 1982 and now abandoned.

The present invention relates to a direct-current dynamo electric machine, and more particularly to a d-c motor suitable as a drive motor for electric road vehicles, such as trolley cars, trolley buses, and the like, and especially to such motors having commutating poles, as well as to the manufacture of making the commutating poll windings.

BACKGROUND

D-C machines, particularly for vehicular use, are described in the book "Electric Machinery" by Dr. Germar Mü ler, VEB-Verlag (Publishers) Berlin, p. 295, see also FIG. 16.16 thereof. Other publications describe such motors.

THE INVENTION

It is an object to provide a method and a structure for the commutating poles of d-c motors suitable for motive use, particularly street vehicles, and the like, which permits spark-free commutation while requiring but little space.

Briefly, the commutating poles are wound with a strip of conductive material, typically copper, which is essentially rectangular in cross section, the winding being wound on edge, that is, with the narrower side forming the curved portion, and the wider side of the cross-sectional area being planar and located in spiral planes around the axis of the pole. The respective layers or winding turns are insulated from each other by hardened, typically sintered powder applied in a fluidized-bed apparatus.

DRAWINGS

Figure 1:
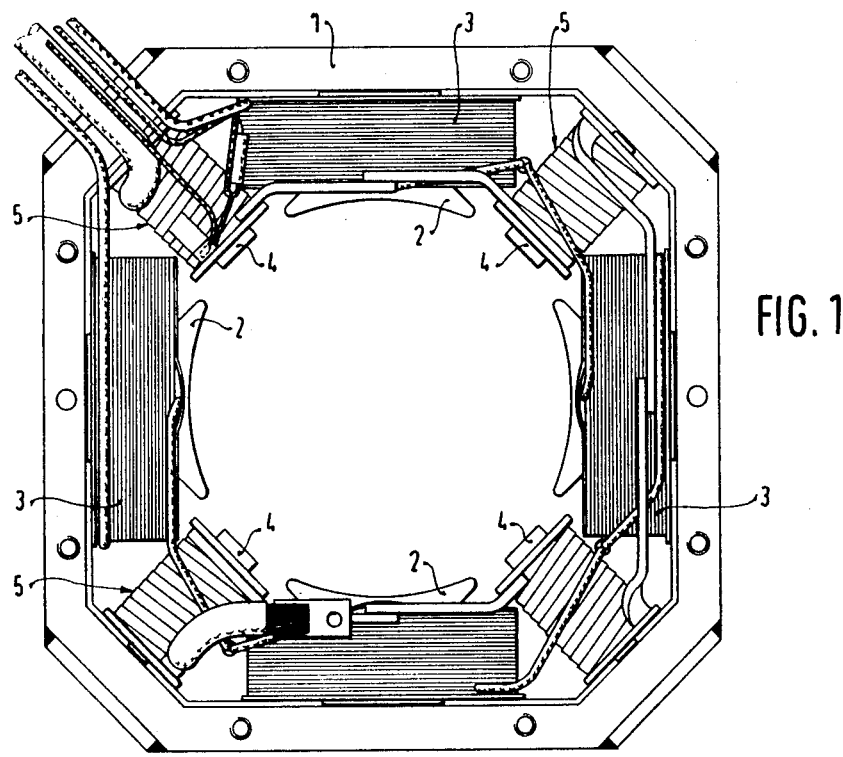
FIG. 1 is an end view of a vehicular-type electric motor having four commutating poles.
Figure 2:
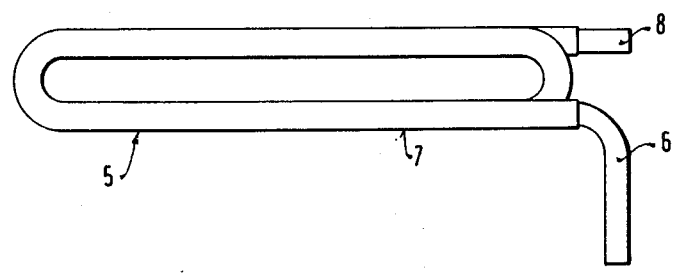
FIG. 2 is a top view of a commutating pole coil.
Figure 3:
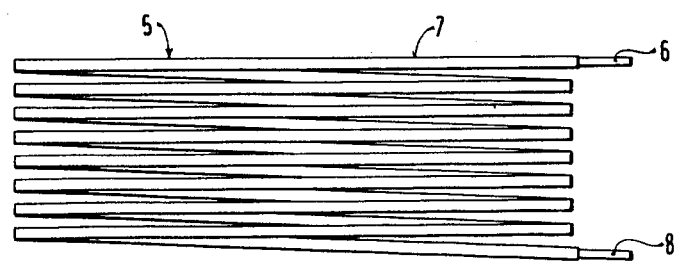
FIG. 3 is a side view, the illustrations of FIGS. 2 and 3 being to an enlarged scale.

The vehicular-type d-c motor has a soft iron armature 1 with four pole shoes 2, each one carrying an exciter winding 3. Four commutating poles 4 are located between the respective main poles 2. Each one of the commutating poles or cores carries a commutating pole winding 5. The commutating pole windings 5 are made of a copper strip 6 which, in cross section, is rectangular. The copper strip 6 is wound on edge, that is, the narrower side of the rectangle forms the curves at the end of the winding, the wider sides of the rectangle forming the top and bottom surfaces of the loops of the windings—see FIGS. 2 and 3. In this specification and claims, this type of winding is referred to as on "edge". The commutating pole windings 5 are so wound that respective winding loops or spirals are slightly spaced from each other. They can be wound tightly but, after having been wound, they will form slightly spaced spirals due to the springiness or resilience of the material, so that the windings will have the configuration, when looked at from the side, as seen in FIG. 3. Initially, the windings are wound with blank or uninsulated copper strip. The respective turns of the windings are insulated from each other by exposing the windings to a fluidized-bed process in which a thin insulating layer 7 of polyethylene, approximately 0.3 mm to 0.4 mm thick, is applied. Any other polymerizable powder which can melt easily can be applied, the powder precipitating on the blank or uninsulated copper of the conductor. After precipitation of the powder on the conductor, it is cured or hardened to form a uniform insulating layer 7 on the individual spirals of coalesced powder.

During the fluidized sintering process, the ends 8 of the copper strip are preferably coated with a covering which prevents precipitation of the sinter powder, the covering later on being stripped off. Thus, the end portions of the windings are left uncoated to provide for ease of electrical connection thereto.

Rather than using polyethylene, polyurethane may also be used. The strip-off coating over the ends 8 of the conductor can be removed before or after the sintering process.

We claim:

1. Direct-current dynamo electric machine, particularly vehicular-type motor, having
   at least two commutating poles (4) and a commutating pole winding (5) on each one of the commutating poles, wherein each commutating pole (4) is made by the steps of
   winding a strip of conductive material (6), having essentially rectangular cross-sectional configuration, on edge,
   permitting the thus-formed edge-wound winding to resiliently expand to form a spiral winding loop having major surfaces facing one another,
   exposing said expanded spaced spiral winding loops to a fluidized bed in which a powder, comprising a curable, hardenable insulating material, is suspended, said powder precipitating in the fluidized bed on said expanded winding loops,
   hardening and curing said powder to form a uniform coalesced insulating coating on the conductive material (6) forming the commutating pole winding, and
   mounting the thus-insulated edge-wound winding on a commutating pole core (4).

2. Machine according to claim 1, wherein the conductive strip comprises copper;
   and the powder comprises at least one of the materials of the group consisting of: polyethylene; polyurethane.

3. Machine according to claim 1, wherein said powder precipitated in the fluidized bed on the winding strip of conductor (6) is hardened or cured by sintering on the conductor.

4. Machine according to claim 1, wherein each commutating pole is produced with terminal ends which are free from the coalesced insulating coating by the additional steps of
   prior to said step of exposing said winding to said fluidized bed, covering ends of said conductive strip (6) with a material which does not coalesce with the conductive strip (6) and,
   subsequent to said exposing and hardening steps, removing said non-coalescing material, and any powder coating thereon, from the conductive strip (6) to form coating-free terminal ends.

* * * * *